United States Patent [19]

Raymond

[11] Patent Number: 4,777,890
[45] Date of Patent: Oct. 18, 1988

[54] MACHINE FOR HANDLING, ASSEMBLING, LAYING, WATERING AND PRESSING SOD ROLLS

[76] Inventor: Gabard Raymond, Buzy, 64260 Arudy, France

[21] Appl. No.: 40,619

[22] Filed: Apr. 21, 1987

[30] Foreign Application Priority Data

Apr. 25, 1986 [FR] France .................. 86 06566
Mar. 20, 1987 [FR] France .................. 87 04341

[51] Int. Cl.$^4$ .................. A01C 11/00; A01B 75/00
[52] U.S. Cl. .................. 111/1; 111/2; 172/19; 414/508; 414/911
[58] Field of Search .................. 111/1–3; 47/9, 56; 172/19; 414/419, 439, 502, 507, 508, 518, 521, 86 R, 86 N, 123, 564, 911; 405/176; 226/89, 172

[56] References Cited

U.S. PATENT DOCUMENTS

| 474,425 | 5/1892 | Updike | 111/3 |
| 964,820 | 7/1910 | Snyder | 111/3 |
| 965,980 | 8/1910 | Autry | 111/3 |
| 2,633,256 | 3/1953 | McGhee | 414/564 |
| 3,159,121 | 12/1964 | Beck | 111/1 |
| 3,982,711 | 9/1976 | Bradley | 172/19 X |
| 4,073,388 | 2/1978 | Carter | 414/564 |
| 4,145,980 | 3/1979 | Boots | 111/1 |
| 4,149,640 | 4/1981 | White | 414/521 |
| 4,289,080 | 9/1981 | Penley | 111/3 |
| 4,408,666 | 10/1983 | Lawson | 111/1 X |

FOREIGN PATENT DOCUMENTS

0023142 1/1981 European Pat. Off. .......... 172/19

Primary Examiner—James R. Feyrer
Attorney, Agent, or Firm—Collard, Roe & Galgano

[57] ABSTRACT

The machine which is the object of the invention comprises a frame 1 supporting on one side a platform for an operator within whose reach lies another platform 5 bearing rolls 7 of turf and further back a second platform 8 whereas on the left hand side of the frame is situated a platform supporting a conveyor belt 13 in a horizontal plane, the rear end of the said conveyor being juxtaposed to a chute 14 extending on two conveyor belts enclosed in a coffer 16, which said coffer 16 carries at its lower end a mechanical cutter 22 and a sprinkler 18.

13 Claims, 7 Drawing Sheets

MACHINE FOR HANDLING, ASSEMBLING, LAYING, WATERING AND PRESSING SOD ROLLS

BACKGROUND OF THE INVENTION

The present invention relates to machines for assembling and laying rolls of pre-cultivated turf on the ground, for example on sports grounds.

At present the laying of precultivated turf is carried out in the traditional way, that is manually, with the help of wheelbarrows, by progressing on boards that are moved forward as the work progresses. Moreover, before the turf is laid, it is necessary to rake the ground lightly so as to remove any footprint, after which the rolls of turf are unrolled and abutted against the previously laid length of turf; then the turf is roller and watered several times. All these tasks are carried out manually and make the turf-laying operation a time-consuming, burdensome and expensive one.

There also exists patents mentioned in the field of search of the initial French application, namely, U.S. Pat. No. 4,149,640 (White) which relates to a means for laying sod on the ground comprising a horizontal platform made up of a conveyor carrying an upstanding support at one end and connected to an inclined plate fitted with a drive sprocket with radially extending fins.

U.S. Pat. No. 4,408,666 (Lawson) relates to an apparatus for guiding the turf to the ground comprising a storage platform and a conveyor.

U.S. Pat. No. 982,711 (Bradley) relates to a sod laying machine comprising a platform made up of several rollers which feed the lengths of turf between conveyor belts through ratchet means.

The present invention remedies these drawbacks as the operators and the rolls of turf are carrie by the machine, which dispenses with the handling of boards and provides a considerable gain in time.

SUMMARY OF THE INVENTION

The machine which is the object of the invention comprises a frame which may be self-propelled or towed. The frame is fitted with broad low-pressure tires in order that the pressure exerted on the ground might not exceed 0.500 kg/cm$^2$ so as not to pack the ground too much.

The frame bears a platform pivotably mounted by any appropriate means, on which is placed a pallet of turf rolls to facilitate unloading by an operator standing on an adjacent platform. The operator takes the rolls of turf one by one and places them on a holding cradle, and the rolls unroll onto a conveyor which lays them on the ground by means of an inclined plane. Before reaching the ground the length of turf is gripped by a paid of conveyor belts in order that it might be accurately positioned against the previously laid length of turf. The speed of the conveyor belts is regulated in proportion to the rate of progress of the machine. Near the end of the conveyor belt nearest to the ground is fitted a mechanical cutter which turns over the superficial layer of the ground and a small water spout placed at the back dampens the layer of earth that has been turned over. The lower end of the conveyor belt is kept close to the previously laid length of turf by means of a guide operated by an adequately suitable device. The rear of the machine bears a platform for an operator and hauls a roller which carries a sprinkler fed by a pipe connected to a hydrant on the ground. The forward end of the machine may be fitted with a guide which is in contact with the outer edge of the previously laid strip of turf. The guide may be fitted with a sensor which acts on the steering of the machine.

The means used to convey the turf to the ground may be constituted partly by conveyor belts offered on the general market.

The drawings annexed to this application illustrate a non-restrictive example of embodiments of the device according to the present invention.

DESCRIPTION OF THE PREFERRED EMBODIMENT

Figure 1:
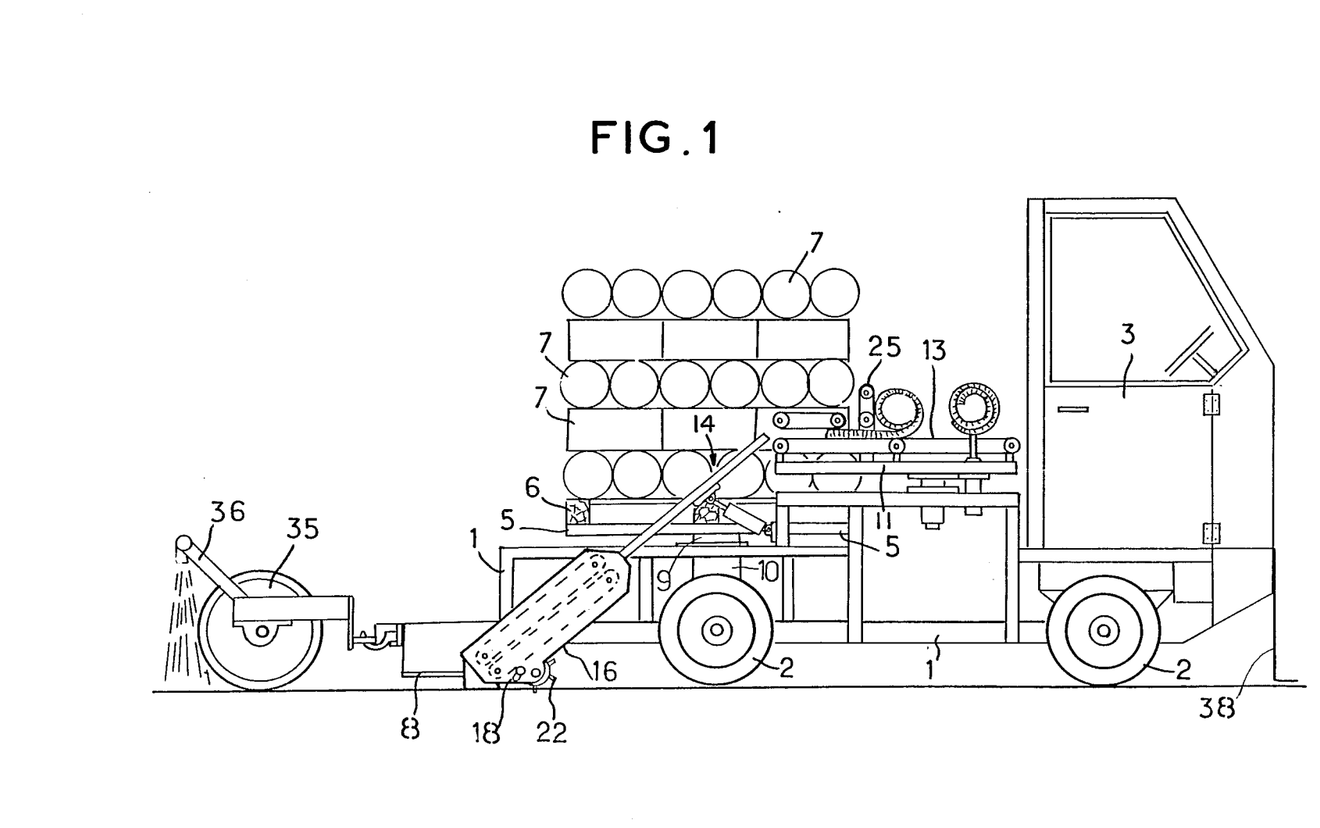
FIG. 1 is an elevation of the entire machine.
Figure 2:
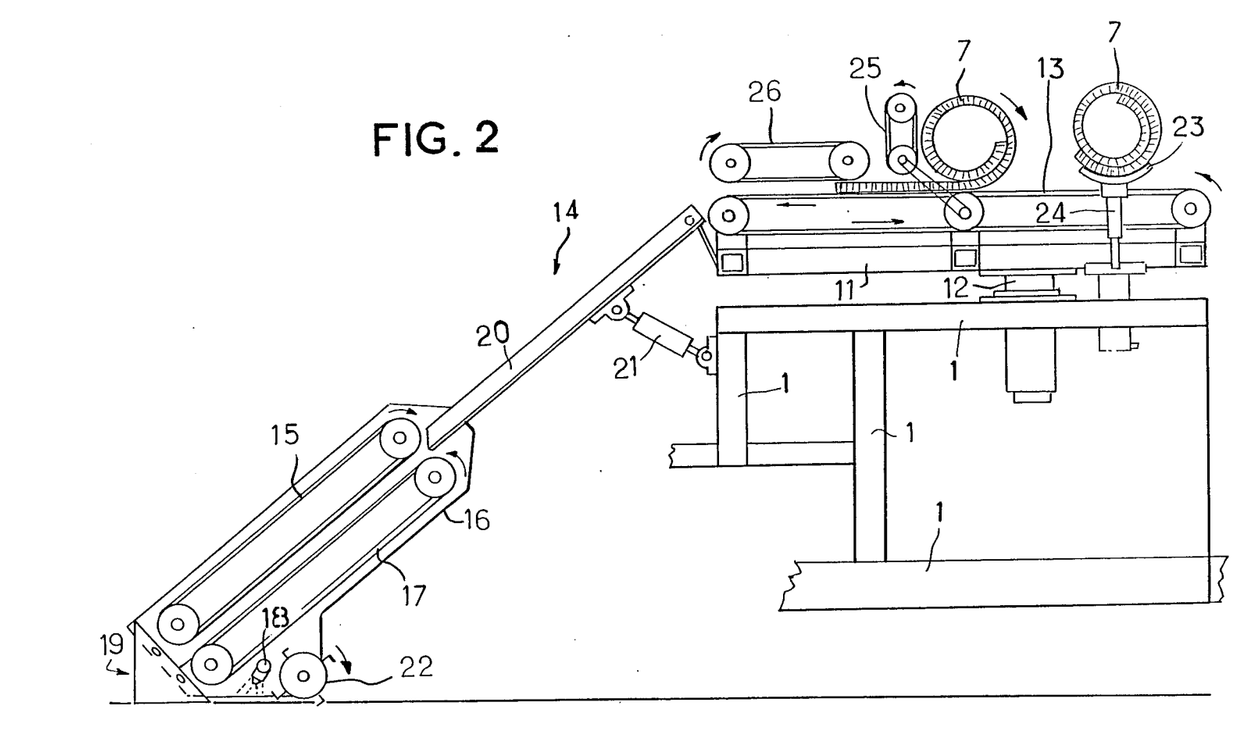
FIG. 2 is an elevation on a different scale of the path followed by the lengths of turf on the conveyor belts and then to the ground.
Figure 3:
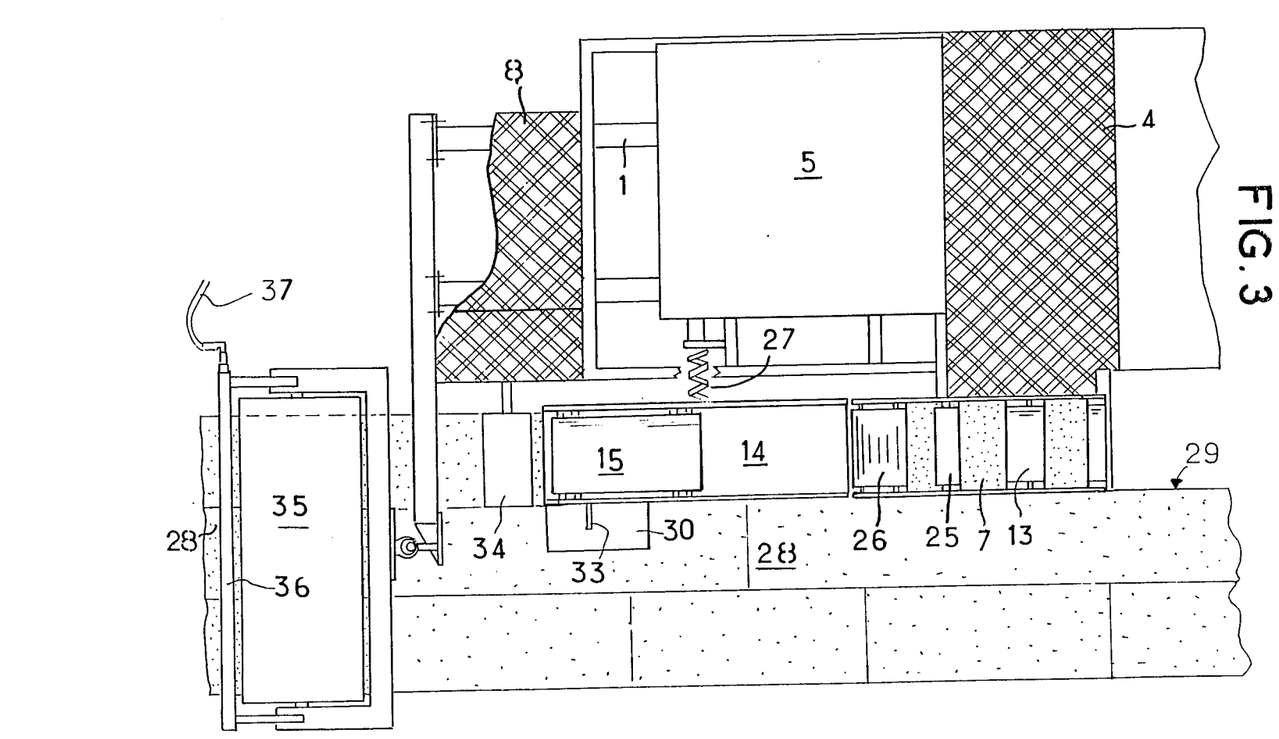
FIG. 3 is a top plan view on another scale of the turf laying machine according to FIG. 1.

As shown in FIGS. 1, 2, 3 and 4, the machine includes a longitudinal frame 1 carried on broad low-pressure tires 2 and hauled by a motor enclosed in a steering-cab 3, on which frame 1 is carried from front to rear, on the right hand side, looking backwards, a platform 4, best seen in FIG. 3, on which stands a first operator within whose reach lies a platform 5 carrying a pallet 6 loaded with rolls 7 of turf and further back on platform 5 is another platform 8, also best seen in FIG. 3, bearing another operator, whereas the elements which carry and lay the turf on the ground are placed on the left hand side of the frame 1.

The platform 5 is mounted pivotably on an upright axle 9 which is worked by a small electric motor 10 whose speed is regulated in proportion to the rate of progress of the machine so as to supply the operator with the rolls 7 of the turf placed on the other side of the pallet. The source of current for the electric motor may be a set of batteries.

The apparatus for transferring the turf comprises a elongated platform 11 pivotably mounted on an upright axle 12, which platform 11 supports a conveyor belt 13 whose rear end is juxtaposed to a chute 14, whose lower end is in turn surrounded by two conveyors 15 and 17 fixed solidly in a framework 16. The end of the framework 16 nearest to the ground is fitted with a mechanical cutter 22 formed, for example, as a soil break-up rotor (such as may be found on general sale) and with a water spount 18 and the lower end of the said framework 16 is provided with a guide 19.

The chute 14 is made up of a metal sheet forming the bottom and of two sides 20 which guide the lengths of turf as they descend by the force of gravity. The chute 14 is articulated at its upper end with the platform 11 through two rods fitted with rotary means such as mobile bearings (not shown), and the chute is operated medially by means of a jack 21 mounted on the frame 1; the jack 21 makes it possible to vary the slope of the chute 14 according to the specific characteristics of the length of turf, and also to raise the lower end of the inclined plane at the end of a strip in order to turn the machine round.

The forward end of the conveyor 13 supports a cradle made up of two parallel arc-shaped holders 23, best seen in FIG. 2, placed on either side of the conveyor, which arc-shaped holders 23 are carried by upright jacks 24, which retract downwards, laying the roll 7 of turf on the conveyor 13 which moves it to the back. The wheel 7 of the turf abuts against a small conveyor belt 25 mounted vertically above the conveyor 13, and the side of the conveyor 25 in contact with the roll of turf moves upwards, thus causing the roll 7 to unroll backwards; the roll 7 then gradually stretches on the conveyor 13, which transports it to the upper end of the chute 14. To enable the roll 7 of turf to unroll properly, a second conveyor belt 26 is also placed above the conveyor 13, but in a horizontal plane, sandwiches the turf in until it reaches the chute 14. The upright jacks 24 are retracted at regular intervals regulated by the rate of laying of the lengths of turf on the ground.

The conveyors 25 and 26 are mounted on the platform 11 by any suitable means and revolve on two drums each.

As best seen in FIG. 3, horizontally extending resilient devices, such as a spring 27 mounted at one end on the side of the chute 14, keeps the latter close to the previously laid strip 28 of turf by means of a horizontally extending guide 19. The guide 19 (see FIG. 4) is made up of a horizontally mounted rectangular plate 30, one length of which has a downward oriented side 31, while one end 32 is curved upwards. The plate 30 is mounted on the side of the framework 16 by means of a clamping plate 33, and the plate 30 glides on the strip 28 of turf and through its side 31 bears on the edge 29 of the turf in such a way that the lengths of turf in the process being laid are carefully fitted to the previously laid strip. The guide 19 may be fitted with a sensor (not shown) acting directly on the device pivoting the axle 12 supporting the platform 11 on which are placed the horizontal conveyors, so as to permanently adjust the laying of the lengths of turf.

A vibrating plate 34, best seen in FIG. 3, mounted by any suitable means on the frame 1 extends behind the framework 16 in order to adjust the lengths of turf as they are laid.

On the rear of the frame is mounted a roller 35 supporting a sprinkler 36 connected by means of a flexible hose 37 to a hydrant (not shown). The roller 35 rolls continuously on the last three strips of turf that have been laid.

At the front of the machine a vertically extending guide 38 fitted with a sensor (not shown) which is in contact with the previously laid strip of turf makes it possible to alter the direction of progress of the machine through appropriate devices.

The speeds of the conveyor belts 13, 15, 17, 25, and 26 are synchronized together by means of regulators and timers as well as by the progresses of the machine.

Figures 4, 5:
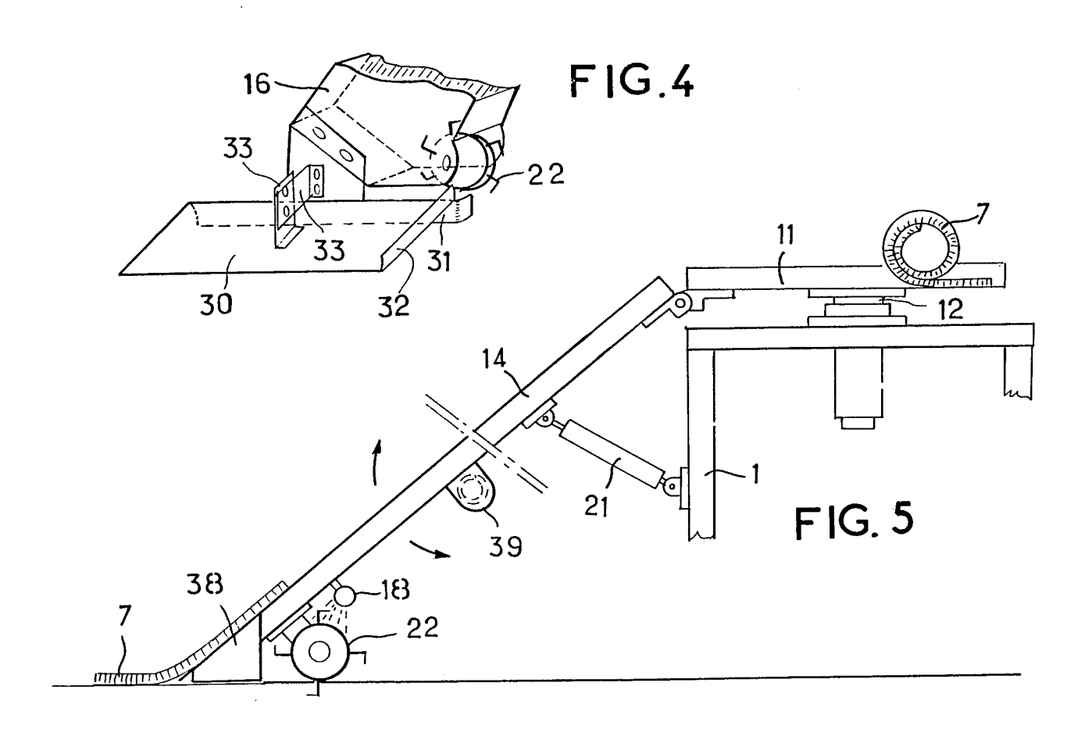
FIG. 4 is a perspective view of a guide placed at the end of the laying apparatus for the purpose of abutting the lengths of turf.
FIG. 5 is an elevation of the path followed by the lengths of turf to the ground, according to a simplified embodiment of the machine.

FIG. 5 shows a simplified embodiment of the machine in as much as the conveyor belts have been dispensed with; so the roll 7 of turf is unrolled manually onto the platform 11, then pushed to the chute 14 on which it decends to the ground by the force of gravity. The lower end of the chute 14 on which it descends to the ground by the force of gravity. The lower end of the chute 14 bears the mechanical cutter 22, the water spout 18 and a guide 38 made up of a simple vertical plate whose lower edge presses on the edge 29 of the previously laid strip 28 through the pressure of the spring 27 bearing on the plate 39 mounted on the chute. According to this simplified embodiment, an operator standing on the platform 8 adjusts the length of turf on the ground manually. FIGS. 6, 7, 8, 9 and 10 show another embodiment of the invention comprising an upper platform 40 supported on a vertically extending shaft 41 which telescopes into a second vertically extending shaft 42 connected to the frame by a horizontally extending shaft 43. On platform 40 there is laid a roll 7 of turf which is pushed by means of a cradle 44 operated by a horizontally extending conveyor belt 46, which is placed on the upper part of the inclined plane; the cradle 44 makes contact conformingly with the roll 7.

The cradle 44 consists of a curved plate of sheet iron mounted in a vertical plane in such a way that the curved side 47 faces the roll 7 of turf, allowing the roll 7 to slide towards the conveyor 46 without warping.

Figure 6:
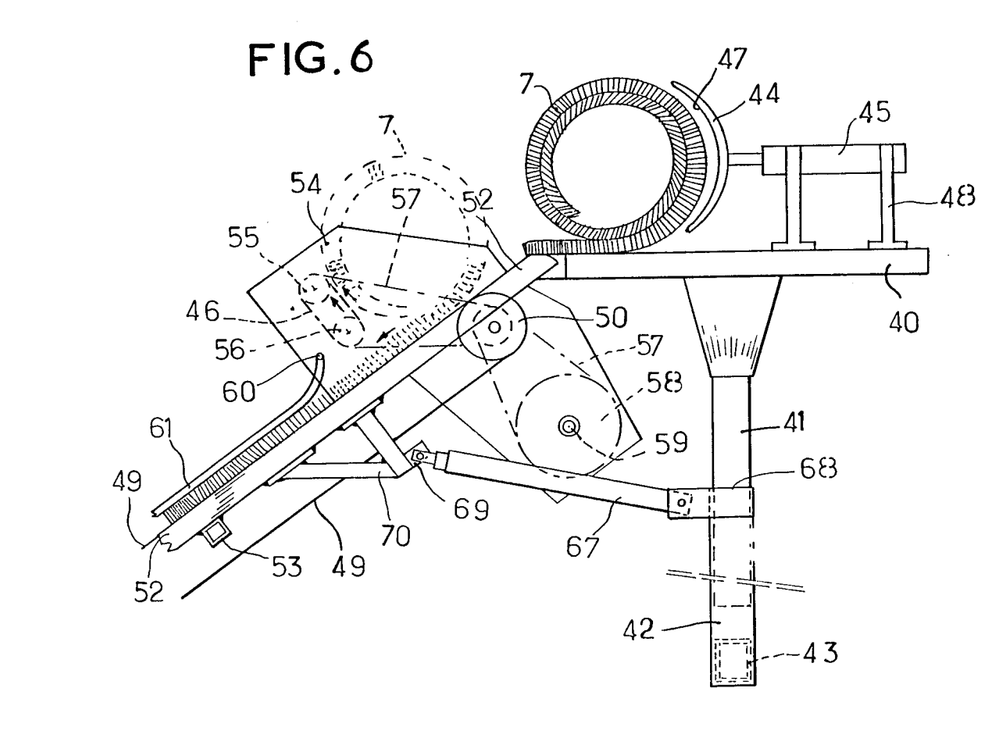
FIG. 6 is a fragmentary elevation of a variant of the horizontal platform used for holding the rolls of turf and of the upper part of the inclined plane.

The cradle 44 is operated on its convex side by the jack 45 which is mounted so as to extend in a horizontal plane by means of two strands 48 on the upper platform 40, best seen in FIG. 6.

Figure 7:
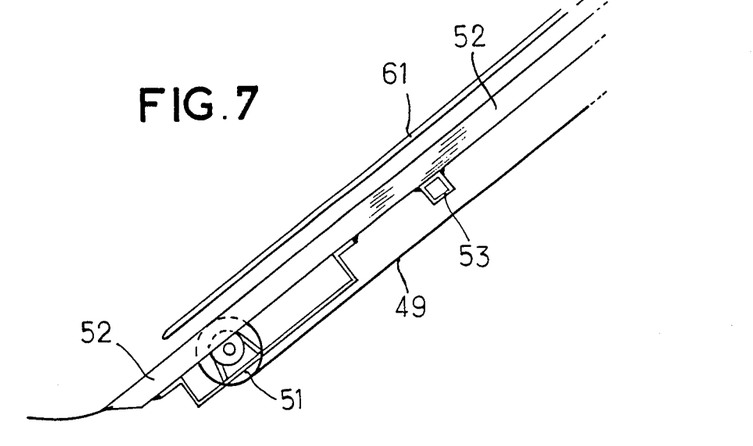
FIG. 7 is a fragmentary elevation of the lower part of the inclined plane according to FIG. 6.

The roll 7 of turf driven by the cradle 44 reaches the inclined plane which, as best seen in FIG. 7, is made up of a conveyor belt 49 driven by the drums 50 (FIG. 6) and 51 (FIG. 7), which drums 50 and 51 are mounted on a lengthwise frame 52 reinforced by extruded cross-bars 53.

At the upper end of the inclined plane, on the sides of the frame 52 are mounted as an extensions of the frame side plates 54 facing each other, which side plates 55 bear two drums 55 and 56 placed one above the other, and driving the conveyor belt 46 which unrolls the roll 7 of the turf. The drums 55 and 56 and the conveyor 49 are driven by the motor of the machine by means of such well-known devices as chains 57, sprocket 58 and axle 59. On a level with drum 59 and across the inclined plane, a rod 60 whose two ends are fixed on the side plates 54 holds, by means of a rotary link, an elongated plate 61 positioned at the center of the conveyor 49 of the inclined plane. The elongated plate 61, due to its inertia caused by its weight, keeps the turf flat on the conveyor and prevents it from getting into a heap. The part 61 may be made of wood, aluminum, or similar strong material.

Figure 8:
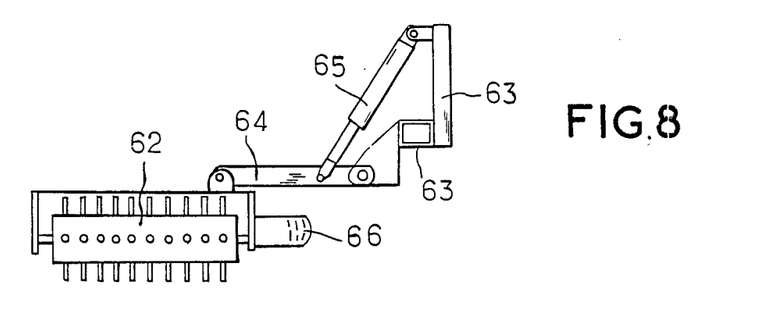
FIG. 8 is a fragmentary elevation of a mechanical cutter and of the device used for mounting it on the frame.

FIG. 8 shows a mechanical cutter 62 situated under the inclined plane and connected to the frame 63 of the machine by means of an articulated arm 64 raised by a jack 65. The mechanicl cutter 62 is worked by a small electric motor 66 and may be coupled to a roller (not shown).

The inclined plane is maneuvered by a generally horizontally extending jack 67 mounted at one end on the vertically extending shaft 42 by means of a clamp 68; at the other end the rod of the jack 67 is linked to a cross bar 69 placed under the conveyor belt 49, and mounted on the frame 52 by means of two side brackets 70.

Figure 9:
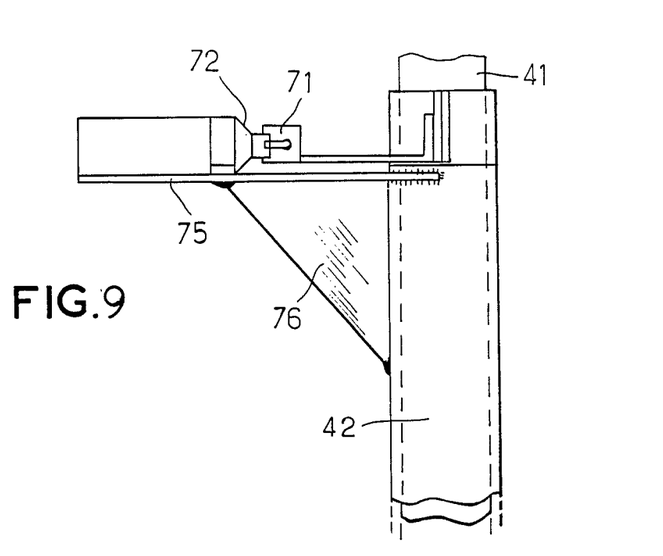
FIG. 9 is a fragmentary elevation on another scale of the guiding cam of the machine according to FIG. 6.
Figure 10:
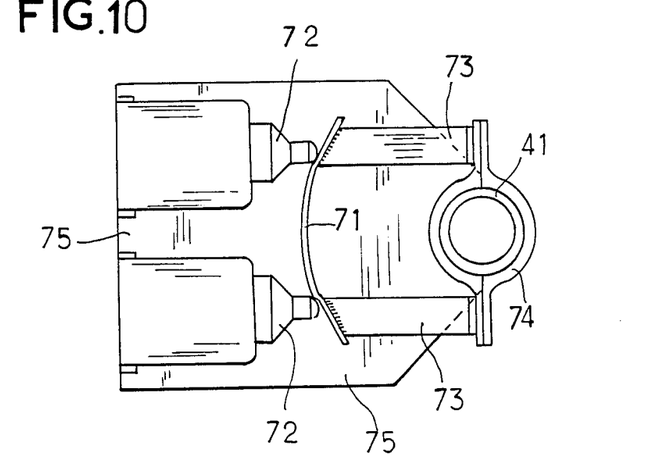
FIG. 10 is a top view of the cam according to the embodiment shown on FIG. 9.

The machine is guided automatically by means of a pad mounted on the lower end of the inclined plane through appropriate means, which pads rest permanently on the previously laid strip of turf, maintaining a constantly controlled pressure. As best seen in FIGS. 9 & 10 on a vertically extending circular shaft 41, which carries the upper platform 40, are mounted a cam 71 and two electric contacts 72, one of which is actuated according to whether the inclined planes moves to the right or to the left and the actuated contact actuates one of the two chambers of a conventional steering jack of the machine.

The cam 71 is made up of a curved iron piece mounted solidly on the shaft 41 by means of two flat iron parts 73 and a circular clamp 74. The electric contacts 72 are carried by a support 75 mounted on the lower shaft 42 by means of a corner plate 76.

I claim:

1. A machine for unrolling, laying and assembling rolls of pre-cultivated turf of a predetermined thickness on the ground, comprising in combination:
   - an elongated frame, said frame including means for powering the machine,
   - a plurality of wheels mounted on said frame, said wheels normally making contact with the ground,
   - elevated means mounted on said frame for holding at least one of the rolls of pre-cultivated turf,
   - a normally inclined chute, means for pivotably mounting a first end of said chute adjacent to said elevated means, means for adjustably positioning a second end of said chute between raised and lowered positions relative to the ground,
   - means for maintaining said second end of the chute in a lowered position relative to previously laid pre-cultivated turf,
   - means for unrolling at least one of said rolls of pre-cultivated turf into a strip and advancing said strip onto said chute, and
   - means at least partly mounted on said chute for propelling the unrolled of said rolls along said chute for placement on the ground, whereby a surface of pre-cultivated turf can be planted by the machine in a continuously assembly of adjacent strips of pre-cultivated turf.

2. The machine according to claim 1, further comprising sprinkler means mounted on said chute for moistening the roll placed on the ground.

3. The machine according to claim 1, wherein said unrolling means includes a first endless conveyor belt means having a surface moving towards said chute, and supporting one of said rolls to be unrolled, a second endless conveyor belt mounted on said frame, and having a surface abutting said one of said rolls to be unrolled on a side of said roll racing said chute, and moving upwardly to unroll the rolled-up turf from said one of said rolls, and a third endless belt means spaced from said first endless conveyor belt means by a predetermined distance equalling approximately the thickness of the turf so that said first and third endless conveyor belt means sandwich the unrolled turf therebetween, and move the so sandwiched turf towards said chute.

4. The machine according to claim 1, further comprising a platform connected with said elevated means and adapted to receive an operator of said machine.

5. The machine according to claim 1, further comprising variable length jack means mounted between said frame and said chute for varying an angle subtended by said chute with respect to the surface of the ground.

6. The machine according to claim 11, wherein said holding means includes a cradle for holding at least one of said rolls, and being mounted on said frame, and further comprising means for mounting said cradle for height adjustment.

7. The machine according to claim 6, further comprising height-adjusting means in the form of at least one jack mounted on said frame over said means for unrolling for staging said roll, said jack being reciprocally moveable along a substantially vertical direction.

8. The machine according to claim 1, wherein said propelling means includes an inclined plate, pivotally mounted near one end thereof to said elevated means on a framework secured to said plate near the other end thereof, and a pair conveyors mounted within said framework for receiving therebetween the unrolled roll of turf from said plate, and for subsequently carrying it towards the ground.

9. The machine according to claim 8, further comprising guide means mounted on said framework for guiding a newly unrolled roll of turf for placement next to an already laid roll of turf, and wherein soil break-up means are mounted on said framework.

10. The machine according to claim 9, further comprising resilient means mounted on said frame and between said chute, and abutting said guide means so as to maintain the latter in a position near the already laid roll of turf.

11. The machine according to claim 1, wherein said elevated means include at least one roll storage platform telescopically height-adjustable shaft means carrying a platform.

12. The machine according to claim 11, wherein said at least one of the rolls is carried by said platform, and further comprising horizontally extending pushing means conformingly making contact with, and pushing said at least one of the rolls, to be unrolled towards said chute.

13. The machine according to claim 11, further comprising chute steering means mounted on said height adjustable shaft means for steering said chute selectively to the right or to the left relative to said at least one roll storage platform

* * * * *